United States Patent [19]

Doud et al.

[11] Patent Number: 4,629,488
[45] Date of Patent: Dec. 16, 1986

[54] COOLING SYSTEM FOR NECK RING AND PARISON MOLD

[75] Inventors: Wilbur O. Doud; Robert E. Davis; Fred R. Sawyer, all of Muncie, Ind.

[73] Assignee: Ball Corporation, Muncie, Ind.

[21] Appl. No.: 839,166

[22] Filed: Mar. 3, 1986

Related U.S. Application Data

[63] Continuation of Ser. No. 683,450, Dec. 19, 1984, abandoned.

[51] Int. Cl.⁴ .............................................. C03B 11/12
[52] U.S. Cl. ........................................ 65/83; 65/85; 65/319; 65/356
[58] Field of Search ............... 65/83, 85, 103, 214, 65/267, 319, 356

[56] References Cited

U.S. PATENT DOCUMENTS

| | | |
|---|---|---|
| 2,467,000 | 4/1949 | Samuelson . |
| 2,508,890 | 5/1950 | Rowe . |
| 2,751,715 | 6/1956 | Denman . |
| 3,015,911 | 1/1962 | Payne . |
| 3,024,571 | 3/1962 | Abbott et al. . |
| 3,241,941 | 3/1966 | Abbott et al. .......................... 65/235 |
| 3,305,344 | 2/1967 | Colchagoff .......................... 65/83 X |
| 3,314,775 | 4/1967 | Shetler et al. ..................... 65/319 X |
| 3,499,746 | 3/1970 | Blankenship et al. ................ 65/265 |
| 3,653,870 | 4/1972 | Foster ..................... 65/356 |
| 3,888,647 | 6/1975 | Breeden et al. .......................... 65/29 |
| 4,251,253 | 2/1981 | Becket et al. .......................... 65/267 |
| 4,525,191 | 6/1985 | Fenton ................................. 65/85 X |

Primary Examiner—Robert Lindsay
Attorney, Agent, or Firm—Gilbert E. Alberding

[57] ABSTRACT

A parison mold portion (20) of an individual glassware molding machine, of the type having a parison mold (22), a split neck ring (28), a neck ring holder (30), an upper receiver cap (40), and a parison plunger (116), is provided with means for cooling the neck ring (28) and the parison mold (22). The means for cooling the neck ring (28) and the parison mold (22) includes a plurality of first cooling holes (214) in the upper receiver cap (40), a plurality of second cooling holes (216) in the neck ring (28) that communicate with the plurality of first cooling holes (214), and a plurality of third cooling holes (230) in the parison mold (22) that communicate with the plurality of second cooling holes (216).

22 Claims, 10 Drawing Figures

COOLING SYSTEM FOR NECK RING AND PARISON MOLD

This application is a continuation of application Ser. No. 683,450, filed 12/19/84, now abandoned.

TECHNICAL FIELD

The present invention relates generally to individual section glassware molding machines. More particularly, the present invention relates to a cooling system for cooling the neck ring, the finish guide ring, and the parison mold in the portion of an individual section glassware molding machine in which the parison is formed.

BACKGROUND ART

In the formation of glassware it has been common practice to form a blank, or parison, in a parison mold portion of the glassware molding machine, to automatically transfer the parison to a blow mold portion of the glassware molding machine, and then to blow mold the parison into conformity to a blow mold.

In the parison mold portion of the glassware molding machine, a gob of molten glass is deposited into the parison mold; and a parison plunger is pressed into the parison mold, forcing the gob of glass into a parison that has the combined shape of the parison mold and the parison plunger.

The parison mold portion of the glassware molding machine includes a neck ring that is constructed of two neck ring halves, and that forms the finish portion, or threaded neck, of the parison.

It is this finish portion, or threaded neck, of the parison that is used in the blow mold portion of the glassware molding machine to hold the parison as the parison is blow molded to the final configuration of the glassware; and this same finish portion becomes the threaded neck of the completed container.

Since the finish portion, or threaded neck, of the parison is used to hold the parison for blow molding, the finish portion must be cool enough to have the physical properties that will enable it to withstand the blow molding process and still retain dimensional integrity for the completed container; and yet, the temperature of the parison must be sufficiently high to provide a viscosity that will blow mold.

Thus, it has been a problem to provide cooling for the neck ring that will provide mechanical strength and dimensional integrity in the finish portion of the parison while maintaining the remainder of the parison at a temperature that is sufficiently high to allow blow molding.

For a number of years the prior art has dealt with sundry means for cooling various components that mold glassware. The current state of art may best be shown, for example, in U.S. Pat. No. 3,024,571 by Abbott et al., in which internal cooling means is provided for glass molding surfaces. Although the patent discloses that cooling air currents may be used by allowing their passage through various components including ring arms, it has been found in actual practice that such methods fall short in providing an effective cooling process. Also related to the suject invention is U.S. Pat. No. 3,015,911 Payne, the patent disclosing a particular cooling scheme for forming neck finishes on glass containers. However, this patent deals with the blow mold side and does not deal with the blank or parison side of the glass forming operation.

In order to overcome the deficiencies in the processes, structural features for cooling glass molding surfaces and the products produced by glassware forming molds presently used, as well as those used heretofore, it is a principal object of the subject invention to provide improved details and characteristics on the blank mold side of a glass forming machine for sufficiently cooling in a controlled fashion a newly formed glass container, particularly the portion surrounding the mouth or opening of said container.

A further object of this invention is to provide means for adequately controlling the amount of heat that may be transferred between molding surfaces for glassware and uniformly cooling the surfaces of the glassware to render them free of any thermal checks or cracks thereon.

Another object of the subject invention is to optimize cooling effects during the formation of the blank or parison so that a finish of a newly produced glass container is formed having a flat terminal portion with a true circular mouth whereby a closure may be properly seated to seat the container.

Another object of the subject invention is to provide means for uniform and sufficient cooling of glassware, especially the finish thereof, without sacrifice of productivity and output from the individual sections of the glass-forming machines.

The subject invention provides means for increasing productivity of glassware and machine efficiency in excess of 10% or more without sacrifice of glassware quality.

Another important feature of the subject invention is that it provides means for controlled cooling on the blank side of a glassware forming machine so that certain treatments are minimized, including swabbing.

DISCLOSURE OF INVENTION

In the present invention, a parison molding portion of an individual glassware molding machine includes a parison mold that consists of a pair of mold halves and that forms the greater portion of the outside contour of the parison, a split neck ring that consists of a pair of neck ring halves and that forms the finish, or threaded neck, of the parison, a finish guide ring that is retained in an interior groove of the neck ring halves and that forms the top surface of the threaded neck of the parison, and a parison plunger that forms the interior of the parison.

The neck ring is juxtaposed to an upper receiver cap; and the upper receiver cap is telescopically connected to a lower receiver cap. A circumferential groove in the upper receiver cap opens downwardly and is telescopically closed by the lower receiver cap. The circumferential groove of the upper receiver cap and the lower receiver cap cooperate to form both a pneumatic actuator and a receiver cap manifold for receiving and for distributing cooling air.

The upper receiver cap includes a plurality of first cooling holes that are disposed radially outward from the vertical axis of the parison mold, that are circumferentially spaced around the vertical axis, and that communicate with the receiver cap manifold.

The neck ring includes a plurality of second cooling holes that are disposed radially outward from the vertical axis of the parison mold, that are circumferentially spaced around the vertical axis, and that are spaced to register with the first cooling holes.

A circumferentially disposed manifold is situated intermediate of the upper receiver cap and the lower receiver cap; and the upper receiver cap is forced upwardly and into contact with the neck ring by the air pressure in the receiver cap manifold. Engaging springs may be employed to assist this engagement.

The parison mold halves each include a plurality of third cooling holes that are vertically disposed, that are circumferentially spaced around the parison mold, and that register with the second cooling holes in the neck ring when the neck ring halves are closed and held against the parison mold.

The parison mold includes an interior groove that is circumferentially shaped; and, when the mold halves close, this interior groove grasps the neck ring, clamping the neck ring halves together and clamping the neck ring halves against the parison mold, and connecting the third cooling holes of the parison mold to the second cooling holes of the neck ring.

The flow of cooling air is introduced into the receiver cap manifold by an air hose; and the cooling air flows upwardly through the first cooling holes in the upper receiver cap, flows upwardly through the portion of the second cooling holes of the neck ring that are disposed below the finish guide ring, flows upwardly through circumferential slots in the finish guide ring that is disposed in an internal circumferential groove in the neck ring halves, and flows upwardly through the portion of the second cooling holes of the neck ring that are disposed above the finish guide ring.

A portion of the cooling air flows upwardly through the third cooling holes that are disposed in the parison mold; and this cooling air is discharged through a mold baffle that is disposed above and juxtaposed to the parison mold.

A remainder of the cooling air then flows radially outward from the neck ring through a plurality of circumferentially spaced and radially disposed notches in the neck ring, thereby providing additional cooling for the neck ring by engagement with the radially disposed cooling notches and a plurality of radially disposed cooling fins that are formed by, and that are interposed between, the cooling notches.

Thus, the neck ring is cooled by a flow of cooling air that flows upwardly through the plurality of vertically disposed and circumferentially spaced second cooling holes in the neck ring, and is cooled by a portion of the cooling air flowing radially out through the radially disposed notches; and the remainder of the cooling air is directed upwardly through a plurality of vertically disposed and circumferentially spaced cooling holes in the parison mold.

The results are that both the neck ring and the parison mold are cooled; but the neck ring receives more cooling than the parison mold; so that the finish portion, or threaded neck, of the parison is cooled sufficiently to give mechanical strength and dimensional stability to the finish portion, and the temperature of the remainder of the parison is kept high enough to permit blow molding of the container.

The essential cooling means achieved by the subject invention is accomplished by the advancement of a plurality of streams of fluid circumferentially situated about the wall portion of the associated neck ring. In essence, effective ring cooling is accomplished on the blank side of the glassware forming machine wherein heat is readily transferred to said neck ring from the associated molding parts and wherein the neck ring, during normal operation, is on the blank side at least about 80% of the time. It is paramount, therefore, that effective cooling be carried out on the blank side and at that stage of the process as opposed to the blow mold side where a minimum of time is spent. Thus, it is important that controlled or programmed cooling be accomplished when heat is actually being taken up or transferred to the neck ring and associated parts. However, because of the rather restrictive mold configuration on the blank side, it has been found, heretofore, to be impractical to accomplish a simplistic and straightforward means for effectively cooling the molding members that come into contact with the finish portion of a glass container.

The subject invention allows for effective cooling of mold portions associated with glassware forming machines, especially during the forming of molten glass in a parison molding assembly to form a parison by means of a plunger inserted into an associated neck ring and blank molding means to define a finish neck portion and an integral body blank portion. In particular, the instant invention relates to a process which comprises advancing streams of fluid within predetermined passageways arranged so as to be circumferentially spaced within the wall portion of the associated neck ring to effectively cool the surfaces being molded, especially at the finish neck portion of the parison being formed. Heretofore, such molding surfaces including the neck ring have been poorly or inadequately cooled by conventional cooling means.

The subject invention, in particular, relates to a mold assembly for pressing a gob of molten glass into a blank mold by means of a plunger inserted into an associated parison and neck mold to form a parison having a body portion and an integral finished neck portion, said mold assembly comprising a receiver having a first array of internal passageways, a neck ring coengagable with said receiver, said neck ring having a finish forming portion adapted to form the finish of the parison, a parison forming mold coengagable with said neck ring and having a molding cavity to form the remainder of the parison, said finish forming portion of said neck ring having a second array of internal passageways spaced from the inner surface of said molding cavity and extending substantially parallel to the central axis of said molding cavity, said parison forming mold having a third array of internal passageways spaced from the inner surface of said molding cavity and extending substantially parallel to said central axis, said first, second, and third arrays of internal passageways being in substantial alignment with one another. In a more preferred embodiment the first array should have a cross sectional area smaller than the second array.

BEST MODE FOR CARRYING OUT THE INVENTION

Figure 1:
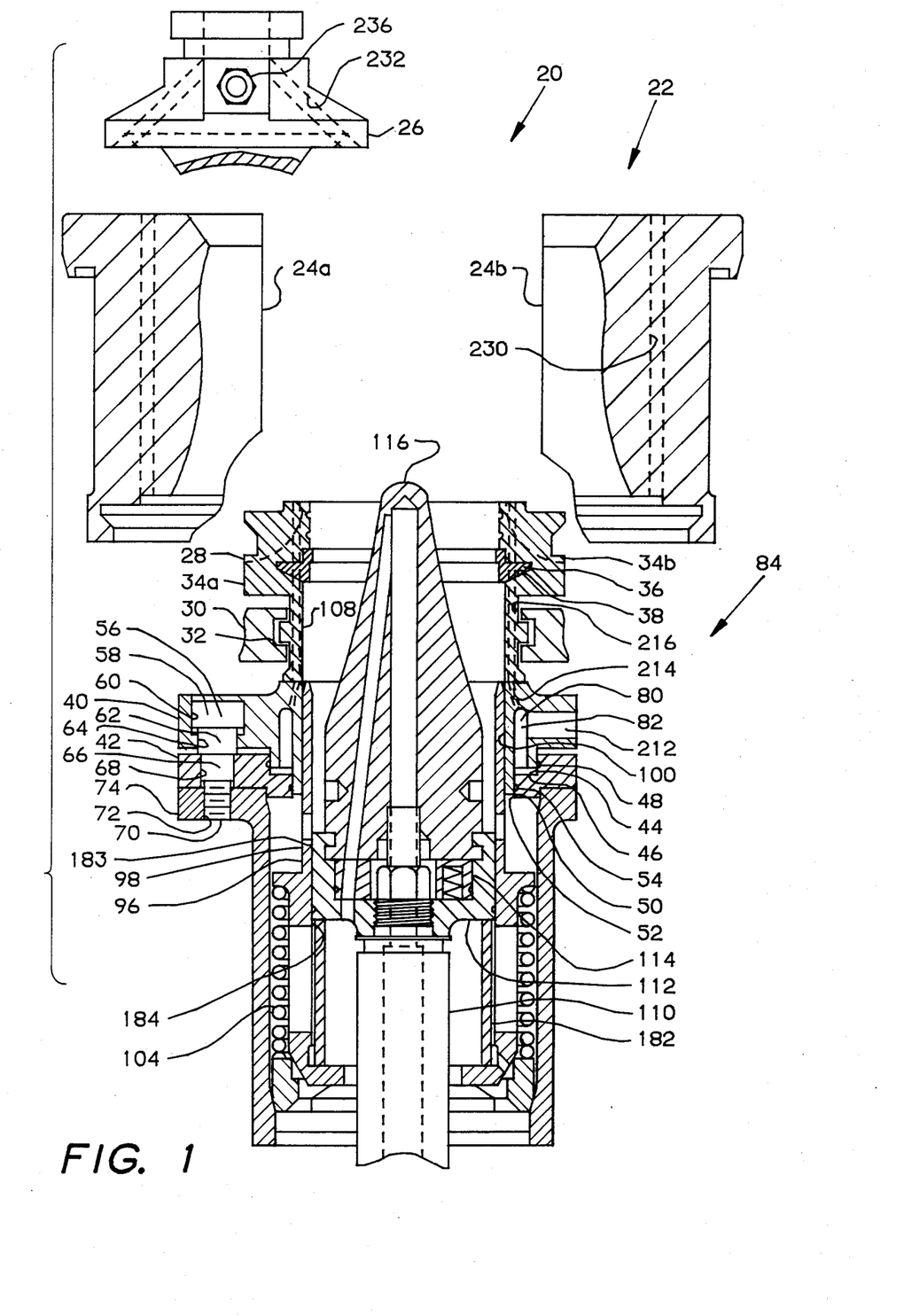
FIG. 1 is a cross sectional elevation of a preferred embodiment of the parison molding portion of an individual section molding machine for molding glassware, with components thereof in a step 1 position wherein the baffle is out, the parison mold halves are separated, the neck ring has been returned from the blow mold portion, the parison plunger is down, and the aligning sleeve is down.

Referring now to the drawings, and more particularly to FIG. 1, a parison molding portion 20 of an individual section glassware molding machine, not shown, includes a parison mold 22 that includes parison mold halves 24a and 25b that are shown in their separated positions, and a mold baffle 26 that is shown in the positon wherein it is removed from the parison mold 22.

The parison molding portion 20 includes a split neck ring 28 that is disposed in a neck ring holder 30, that rests down against a shoulder 32 of the neck ring holder 30, and that includes a neck ring half 34a and 34b. A finish guide ring 36 is retained in an internal groove 38 in the neck ring 28.

The molding portion 20 includes an upper receiver cap 40 and a lower receiver cap 42. The upper receiver cap 40 includes an outer pilot 44 that is cylindrically shaped; and the lower receiver cap 42 includes a pilot counterbore 46. The outer pilot 44 is slidably fitted into the pilot counterbore 46; and a sliding seal 48 sealingly engages both the pilot counterbore 46 and the outer pilot 44.

The upper receiver cap 40 includes an inner pilot 50 that is circumferentially shaped; and the inner pilot 50 telescopically engages an inner bore 52 of the lower receiver cap 42. A sliding seal 54 sealingly engages both the inner bore 52 and the inner pilot 50.

The upper receiver cap 40 is rotationally fixed to the lower receiver cap 42, but is allowed limited upward movement by means of a plurality of circumferentially spaced shoulder bolts 56.

The shoulder bolts 56 include heads 58 that are disposed in counterbores 60 of the upper receiver cap 40, larger shanks 62 that are disposed in larger holes 64 of the upper receiver cap 40, smaller shanks 66 that are disposed in smaller holes 68 of the lower receiver cap 42, and threaded portions 70 that threadingly engage threaded holes 72 of a guide body 74.

The shoulder bolts 56 securely and rigidly attach the lower receiver cap 42 to the guide body 74 by the larger shanks 62 engaging the lower receiver cap 42 and by the threaded portions 70 engaging the threaded holes 72 of the guide body 74; and the shoulder bolts 56 rotationally index the upper receiver cap 40 to the lower receiver cap 42 while allowing limited vertical movement of the upper receiver cap 40 by virtue of the larger shanks 62 being longer than the length of the larger holes 64 of the upper receiver cap 40.

The upper receiver cap 40 includes a manifold groove 80 that is circumferentially disposed around the upper receiver cap 40, that extends upwardly thereinto, and that cooperates with the lower receiver cap 42, and with the sliding seals 48 and 54 to provide an air manifold, or receiver cap manifold, 82.

Also, the circumferential manifold groove 80 cooperates with the telescoping action of the outer pilot 44 and the pilot counterbore 46, with the telescoping action of the inner pilot 50 with the inner bore 52, and with the sliding seals 48 and 54, to provide an air powered actuator 84 for forcing the upper receiver cap 40 into engagement with the neck ring 28.

Figure 2:
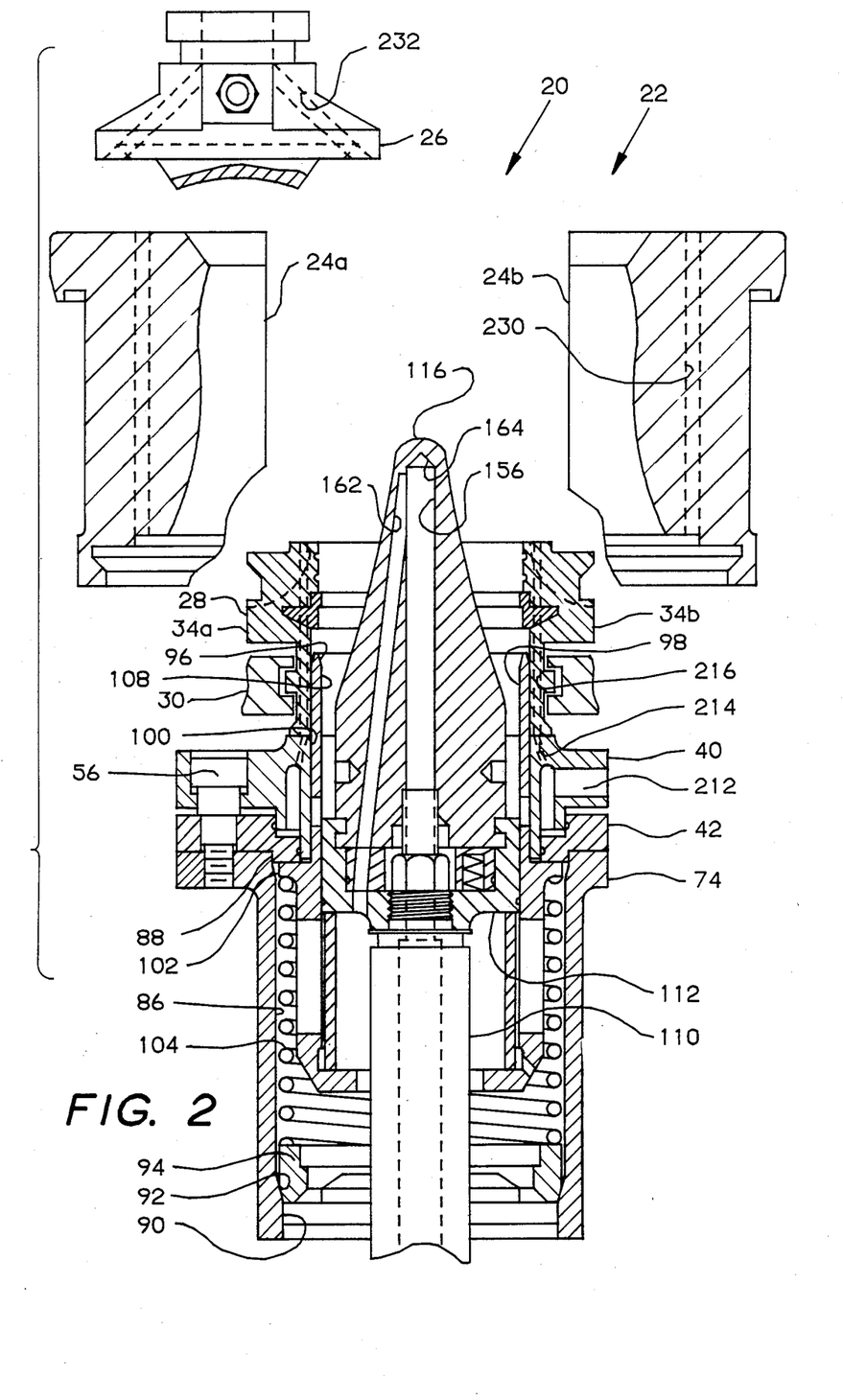
FIG. 2 is a cross sectional elevation of the embodiment of FIG. 1, with components thereof in a step 2 position wherein the aligning sleeve has been raised and has been inserted into the neck ring by the loading position spring, and the parison plunger has been raised to the loading position by the positioning spacer and the loading position spring.

Referrring now to FIG. 2, the guide body 74 includes a first bore 86; the lower receiver cap 42 includes a pilot 88 that provides radial alignment between the lower receiver cap 42 and the guide body 74 by engaging the first bore 86; and, as previously noted, the shoulder bolts 56 bolt the lower receiver cap 42 to the guide body 74.

The guide body 74 includes a reduced diameter bore 90 and a stop chamfer 92 that is disposed intermediate of the bores 86 and 90. The stop chamfer 92 serves as a retaining stop for a spring adapter 94.

An aligning sleeve 96 includes a cylindrically shaped aligning portion 98 that is slidingly disposed inside a guide bore 100 of the upper receiver cap 40; the aligning sleeve 96 includes a spring adapter flange 102 that engages a loading position spring 104.

In the FIG. 2 illustration, the aligning portion 98 of the aligning sleeve 96 is slidably engaged with both the guide bore 100 of the upper receiver cap 40 and an inside surface, or guide bore, 108 of the neck ring 28.

Figure 7:
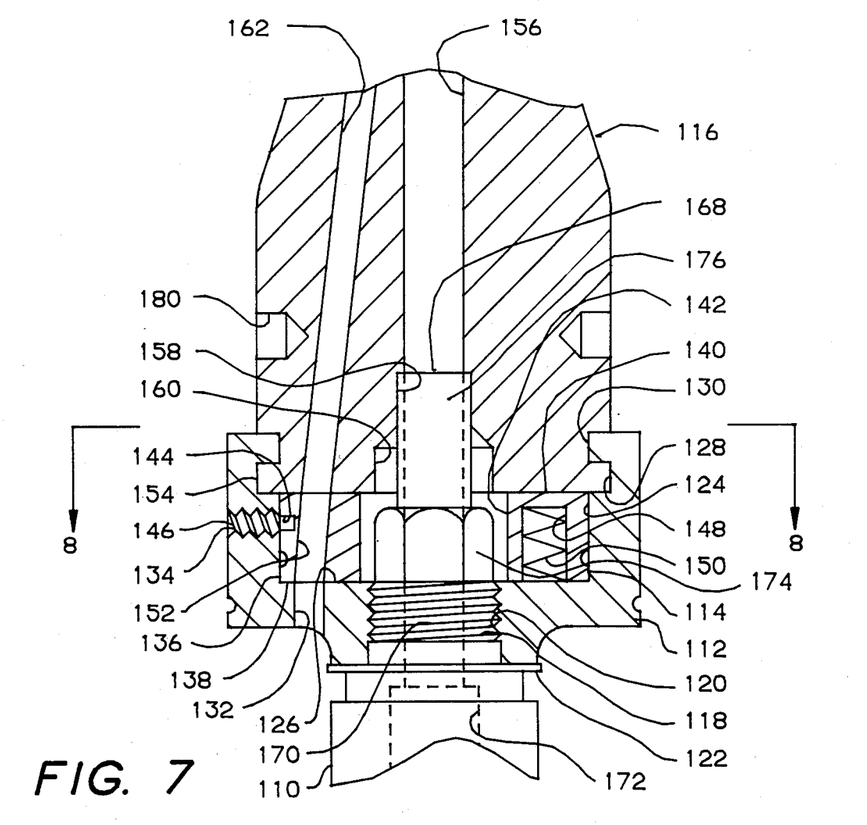
FIG. 7 is an enlarged cross sectional elevation of the parison plunger, the plunger head, the pressure ring, and the plunger rod of the embodiment of FIGS. 1-6, taken substantially the same as FIGS. 1-6.
Figure 8:
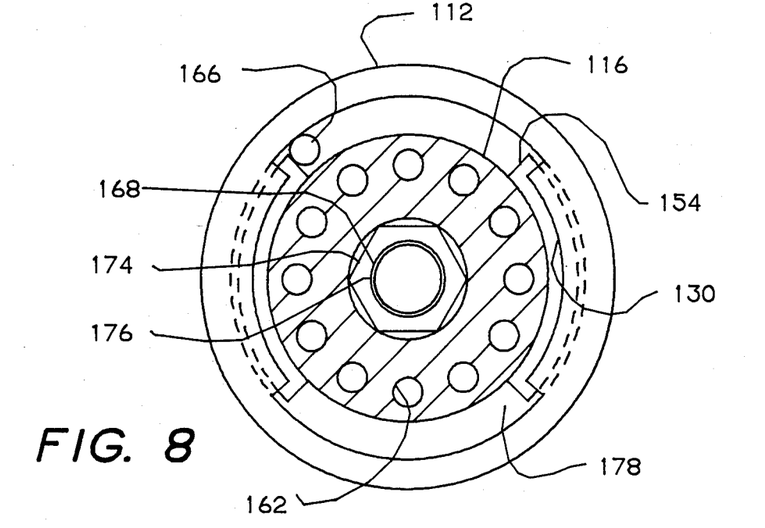
FIG. 8 is a cross section of the parison plunger and a top view of the plunger head, taken substantially as shown by section line 8—8 of FIG. 7, and showing the method of mounting the parison plunger into the plunger head.

Referring now to FIGS. 2, 7, and 8, but more particularly to FIGS. 7 and 8, the parison molding portion 20 includes a plunger rod 110, a plunger head 112 that is attached to the plunder rod 110, a pressure ring 114 that is disposed in the plunger head 112, and a parison plunger 116 that is attached to the plunger head 112.

The plunger rod 110 includes an externally threaded portion 118; and internal threads 120 of the plunger head 112 engage the threaded portion 118. A lockwasher 122 cooperates with the threaded portion 118 and the internal threads 120 to secure the plunger head 112 to the plunger rod 110.

The plunger head 112 includes a bore 124 having a bottom surface 126, a retainer groove 128, retaining lips 130, a plurality of vertically disposed and circumferentially spaced exhaust holes 132, and a plurality of circumferentially spaced and threaded set screw holes 134.

The pressure ring 114 includes an outer diameter 136 that is slidably inserted into the bore 124, a bottom surface 138 that is juxtaposed to the bottom surface 126 of the plunger head 112, a top surface 140, a bore 142, and set screw depressions 144 that are circumferentially spaced to coincide with the circumferential spacing of the threaded set screw holes 134. Dog point set screws 146 are inserted into the set screw holes 134 and engage the set screw depressions 144.

The pressure ring 114 includes a plurality of spring receiving bores 148 that are circumferentially spaced and that extend upwardly from the bottom surface 138. A plurality of springs 150 are inserted into the bores 148 and press both upwardly on the pressure ring 114 and downwardly on the plunger head 112.

Upward movement of the pressure ring 114 is restricted by the set screws 146 and by the set screw depressions 144, the set screw depressions 144 being sufficiently large to allow a limited amount of upward movement of the pressure ring 114.

The pressure ring 114 includes a plurality of circumferentially spaced second exhaust holes 152 that are indexed by the set screws 146 to align with the first exhaust holes 132 of the plunger head 112.

The parison plunger 116 includes a pair of second retaining lips 154 that retainably engage the first retaining lips 130 of the plunger head 112.

The parison plunger 116 includes a longitudinal exhaust hole 156, a first counterbore 158 that is coaxial with the longitudinal exhaust hole 156, and a second counterbore 160 that is coaxial with the longitudinal exhaust hole 156.

A plurality of third exhaust holes 162 are circumferentially spaced around the parison plunger 116; each of these third exhaust holes 162 slope radially inward and make fluid communication with the longitudinal exhaust hole 156 at an end 164 of the longitudinal exhaust hole 156, as shown in FIG. 2; and the third exhaust holes 162 register with the second exhaust holes 152. Thus, registering of the third exhaust holes 162 with the second exhaust holes 152 is achieved by means of an indexing pin 166 in the plunger head 112 that engages one of the second retaining lips 154, as can be seen in FIG. 8.

Continuing to refer to FIGS. 7 and 8, the parison molding portion 20 includes a connecter tube 168 having a threaded portion 170 that threadingly engages a plunger rod bore 172 of the plunger rod 110, having a hexagonal portion 174, and having a tubular portion 176 that slidingly engages the first counterbore 158 of the longitudinal exhaust hole 156.

Thus the connector tube 168 serves as a means of conducting exhaust air from the plunger rod bore 172 of the plunger rod 110 to the exhaust hole 156 of the parison plunger 116.

To assemble the parison plunger 116 into the plunger head 112, the second retaining lips 154 of the parison plunger 116 are indexed into spaces 178 that are disposed intermediate of the first retaining lips 130, the parison plunger 116 is pressed downwardly against the pressure ring 114, depressing the springs 150, and the parison plunger 116 is rotated clockwise, as seen in FIG. 8, until one of the second retaining lips 154 engages the indexing pin 166, a pair of spanner wrench holes 180 are circumferentially spaced around the parison plunger 116 and may be used in achieving the aforesaid clockwise rotation of the parison plunger 116.

Referring now to FIG. 1, in a first step of the operation of the parison molding portion 20, the baffle 26 has been removed from the parison mold 22, the parison mold halves 24a and 24b are separated, the neck ring 28 has been returned from the blow mold portion, not shown, of the glass molding machine, the plunger head 112 is down against a positioning spacer or spacer tube 182, the parison plunger 116 is at its lowermost position, and the aligning sleeve 96 is in its lowermost position, as determined by the spacer tube 182; wherein the aligning sleeve 96 is not engaging the neck ring 28.

Radial alignment of the aligning sleeve 96 with the upper receiver cap 40 is by means of sliding fit of the cylindrically shaped portion 98 of the aligning sleeve 96 with the guide bore 100 of the upper receiver cap 40; and radial alignment of the parison plunger 116 with the aligning sleeve 96 is by means of sliding contact between a cylindrical surface 183 of the plunger head 112 and a cylindrical bore 184 of the aligning sleeve.

Referring now to FIG. 2, in a second step of the operation of the parison molding portion 20, the aligning sleeve 96 has been raised and has been inserted into the guide bore 108 of the neck ring 28 by the force of the loading position spring 104, and the parison plunger 116 has been raised to the loading position by the spacer tube 182 and by the force of the loading position spring 104.

Figure 3:
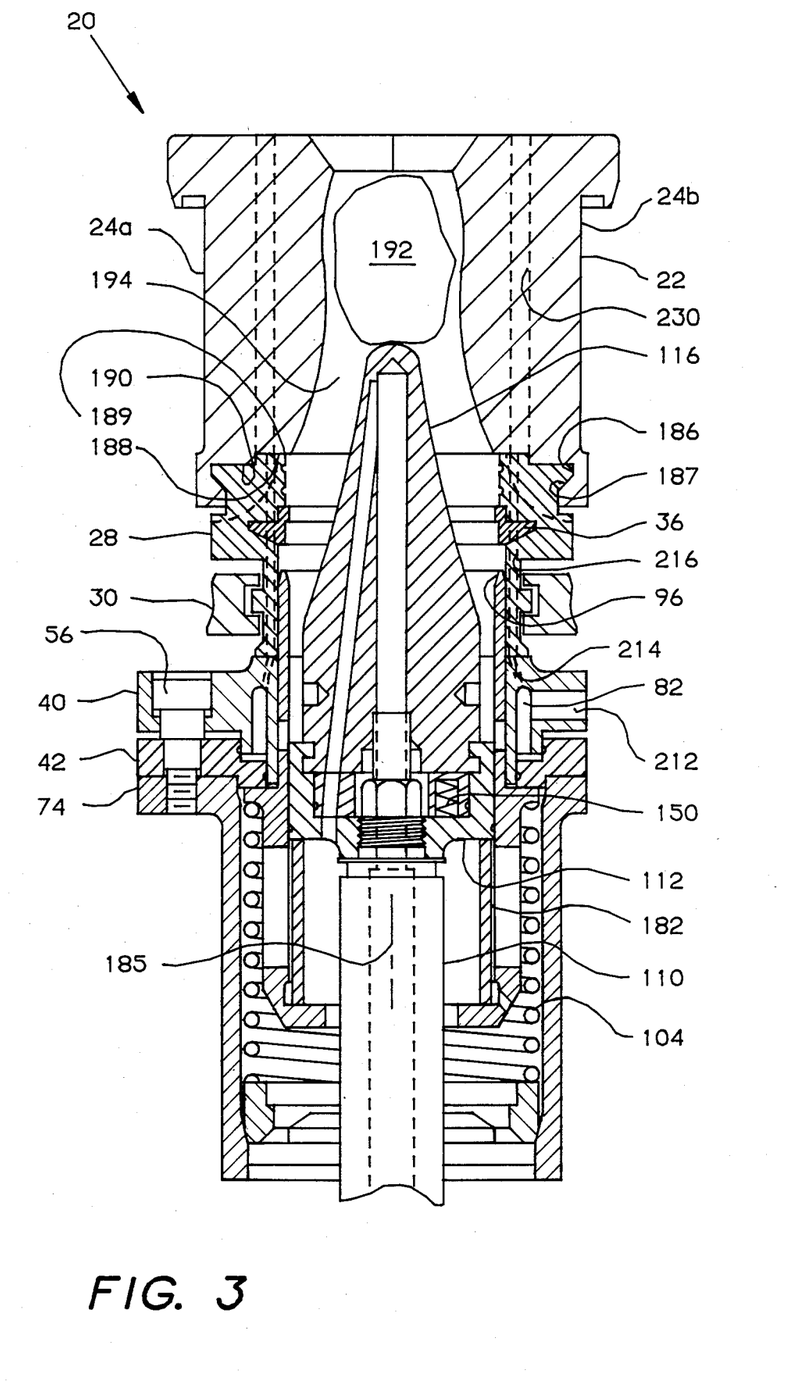
FIG. 3 is a cross sectional elevation of the embodiment of FIGS. 1 and 2, with components thereof in a step 3 position wherein the parison mold halves are closed, the neck ring is clamped between and against the parison mold halves, and a gob of molten glass has been deposited in the parison mold.

Referring now to FIG. 3, in a third step of the operation of the parison molding portion 20, the parison mold halves 24a and 24b have been closed around a vertical axis, or central axis, 185 of the parison molding portion 20; and the neck ring 28 is clamped both between and against the parison mold halves 24a and 24b by a circumferential groove 186 of the parison mold halves 24a and 24b.

As shown in FIG. 3, the circumferential groove 186 includes a first frustoconical surface 187, engages a second frustoconical surface 188 of the neck ring 28, forcing a surface 189 of the neck ring 28 into engagement with a surface 190 of the mold halves 24a and 24b.

Also, as shown in FIG. 3, a gob 192 of molten glass has been deposited inside a mold chamber 194 of the parison mold 22.

Figure 4:
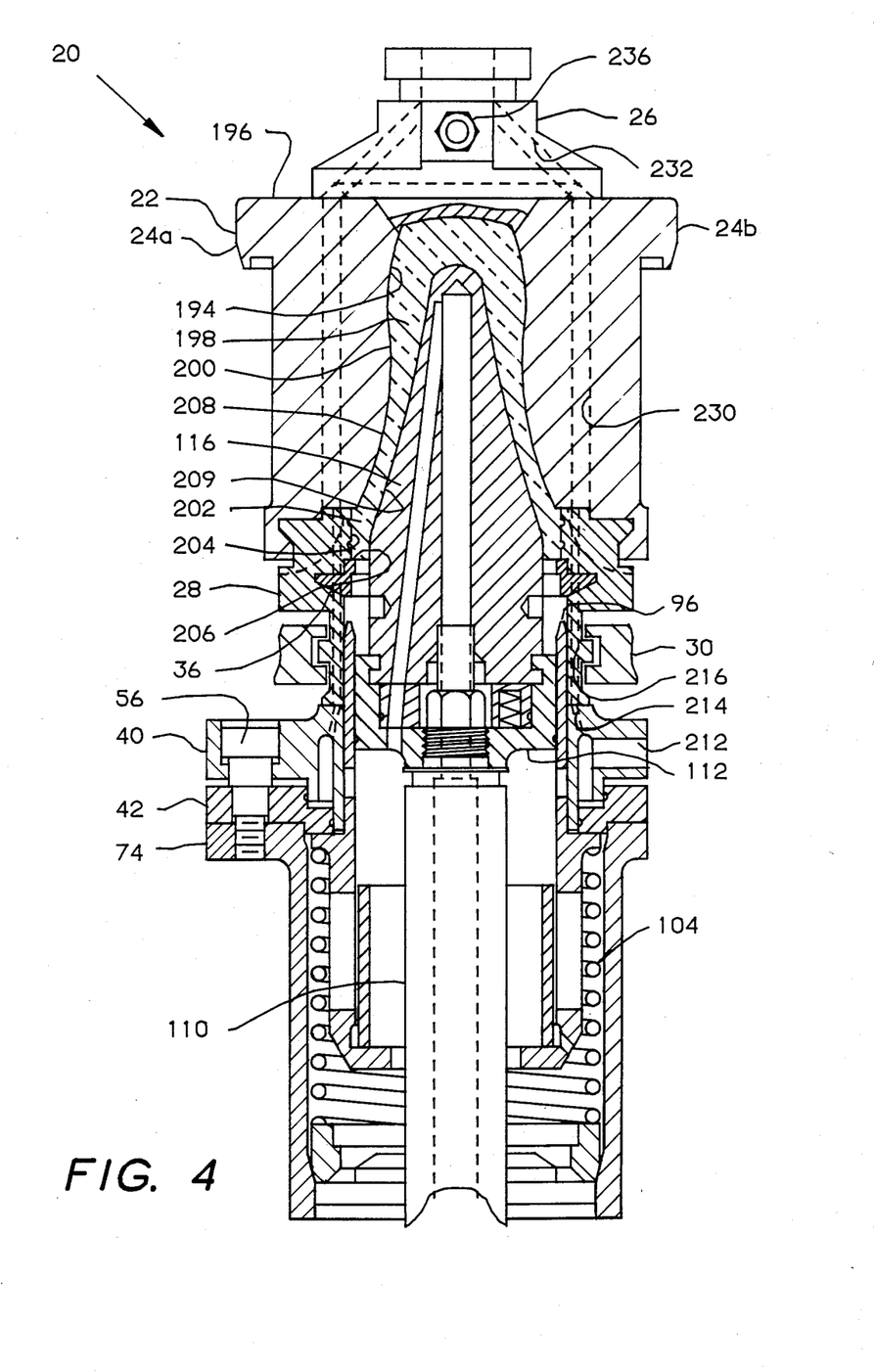
FIG. 4 is a cross sectional elevation of the embodiment of the preceding FIGURES, with the components thereof in a step 4 position wherein the baffle is closing the top of the parison mold, the parison plunger has been forced upward, and a parison has been formed from the gob of molten glass.

Referring now to FIG. 4, in a fourth step of the operation of the parison molding portion 20, the baffle 26 has been placed upon a top surface 196 of the parison mold 22, closing the mold chamber 194, and the parison plunger 116 has been forced upwardly by the plunger rod 110 and by a pneumatic cylinder, not shown, forming a parison 198 from the gob 192 of FIG. 3.

The parison 198 includes an outer contour 200 having a finish portion 202 that conforms to both an inner surface 204 of the neck ring 28 and a seating lip surface 206 of the finish guide ring 36, having a container portion 208 that conforms to the shape of the mold chamber 194, and having an interior surface 209 that conforms to the shape of the parison plunger 116.

Figure 5:
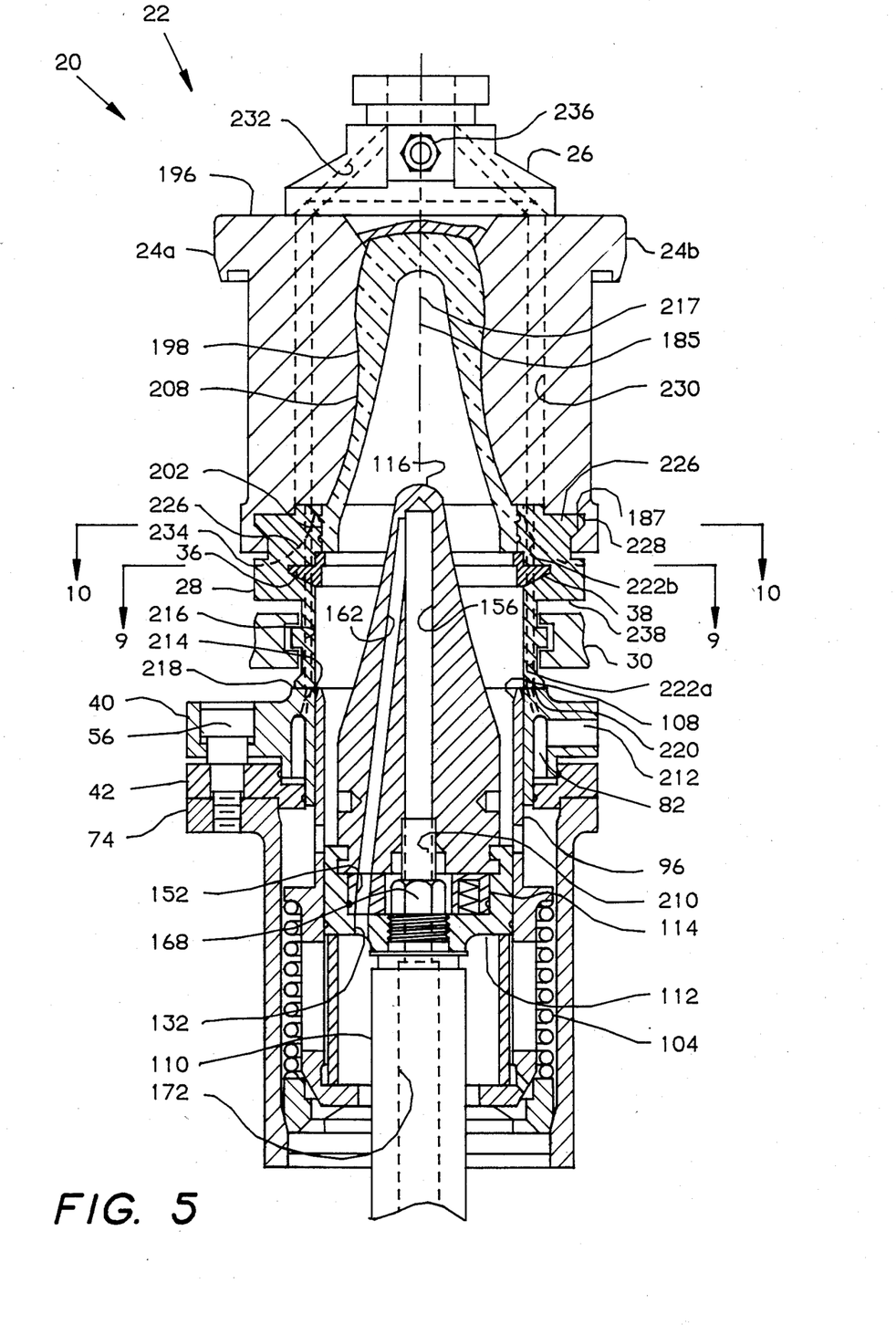
FIG. 5 is a cross sectional elevation of the embodiment of the preceding FIGURES, with the components thereof in a step 4 position wherein the plunger rod has been pulled down to its lowermost position by an air cylinder, and the aligning sleeve has been pulled downwardly and out of the neck ring by the air cylinder.

Referring now to FIG. 5, in a fifth step of the operation of the parison molding portion 20, the parison plunger 116 has been pulled downward and out of the parison 198 and into its lowermost position by the plunger rod 110 and by the pneumatic cylinder, not shown; and the aligning sleeve 96 has been pulled downward and out of the neck ring 28 by the plunger rod 110 and by the pneumatic cylinder.

Figure 6:
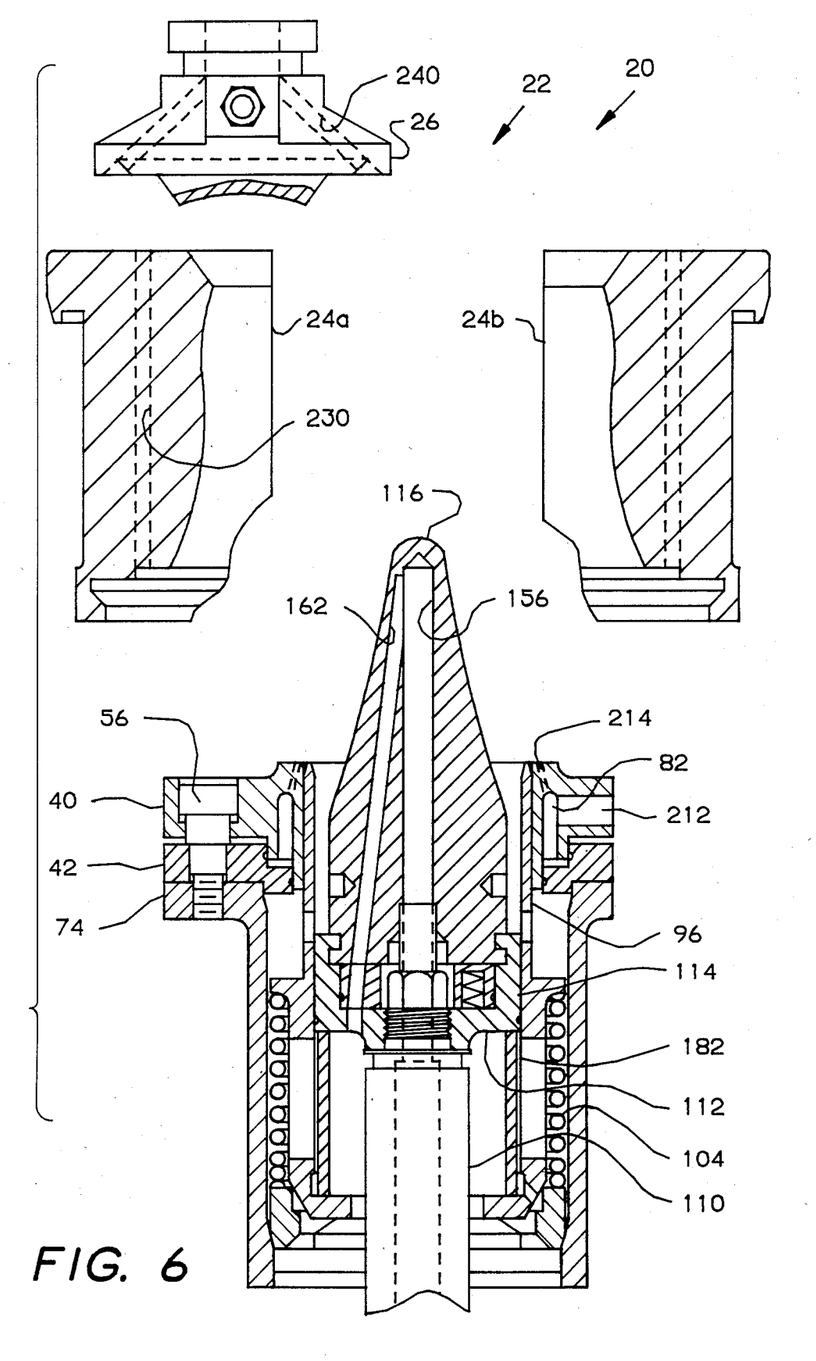
FIG. 6 is a cross sectional elevation of the embodiment of the preceding FIGURES, with the components thereof in a Step 5 position wherein the baffle has been removed from the parison mold, the parison mold halves have been separated, and both the neck ring and parison have moved to the blow mold portion of the individual section glassware molding machine.

Referring now to FIG. 6, in a sixth and final step of the operation of the parison molding portion 20, the baffle 26 has been removed from the parison mold 22, the parison mold halves 24a and 24b have been opened, and both the parison 198 and the neck ring 28 have been transferred to the blow mold portion, not shown, of the glassware molding machine by the neck ring holder 30.

Referring now to FIGS. 1–10, but more particularly to FIG. 5, cooling of the parison plunger 116 is accomplished by supplying air through the plunger rod bore 172. This air is supplied to the plunger rod bore 172 through the pneumatic cylinder; and the plunger rod 110 is an integral part of the pneumatic cylinder.

Pneumatic cylinders for use in individual glassware molding machines commonly include a first cylinder port that is used to supply air for moving the plunger rod 110 upwardly, a second port that is used to supply air for moving the plunger rod 110 downwardly, and a third port that communicates with the plunger rod 110 at all times by means of a telescoping tube which enters the bottom of the pneumatic cylinder. This type of pneumatic cylinder is a standard production item and is not a part of the present invention.

The air that is furnished to the plunger rod 110 moves upwardly through the plunger rod bore 172 of the plunger rod 110, through an opening 210 in the connector tube 168, through the longitudinal exhaust hole 156 of the parison plunger 116, downward through the third exhaust holes 162 of the parison plunger 116, through the second exhaust holes 152 of the pressure ring 114, and downward through the first exhaust holes 132 of the plunger head 112.

It is well known that in production of high quality glassware two steps are required in forming glassware from a gob of molten glass: first, a gob of molten glass is formed at one station into a parison or blank by pressing the gob in a parison blank mold, and then at a second separate station formed into a final shape by means of a blow mold. The subject invention relates to effective cooling in the first station side of this process, that is, the parison or blank mold side. There are particular problems regarding effective temperature control associated especially with that side of the process as opposed to the blow mold side that stem from dimensional limitations.

There have been many approaches in attempting to control cooling of molding components in glassware forming machines that have been tried in the past but they have been of limited success due, it is believed, to essentially not allowing sufficient cooling conditions to prevail and not providing uniform temperature conditions for molding surfaces for control of container quality.

The subject invention allows for a better formed container, especially in the neck or finish portion thereof in that said finish surface is substantially flatter or planar in the terminal configuration as well as having a truer circular configuration for the opening at the mouth of the container. Optimum conditions are necessary in the forming phase for that portion of the container in order to permit a closure to fit snugly and firmly thereover.

Figure 9:
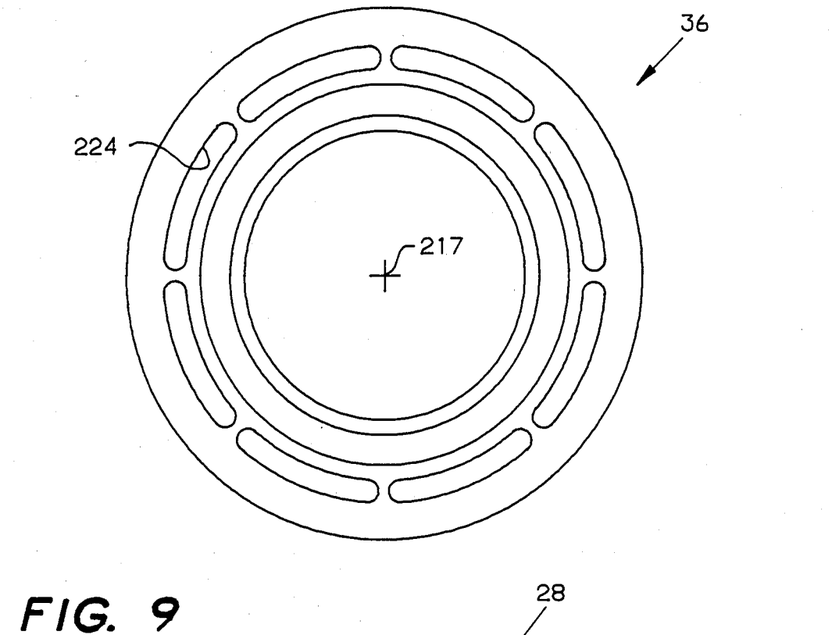
FIG. 9 is a top view of the finish guide ring, taken substantially as shown by view line 9—9 of FIG. 5, and showing the cooling slots of the finish guide ring.
Figure 10:
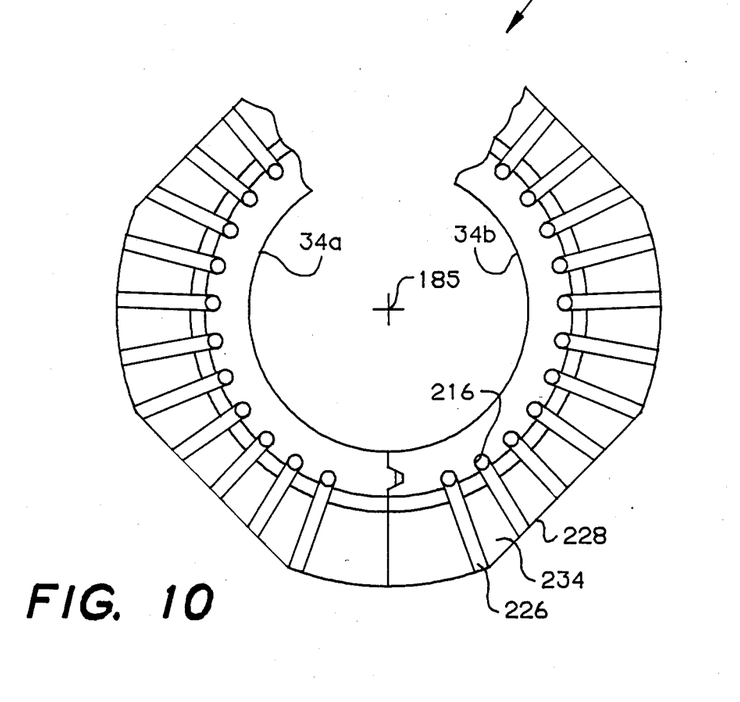
FIG. 10 is a top view of the neck ring, taken substantially as shown by view line 10—10 of FIG. 5, showing the cooling notches, and showing the cooling fins that are disposed between adjacent ones of the cooling notches.

Referring now to FIGS. 5, 9, and 10, cooling of the neck ring 28 and the parison mold 22 is accomplished by supplying air to a port 212 of the upper receiver cap 40 and into the air manifold 82 that is formed by the upper receiver cap 40 and the lower receiver cap 42.

The air that is supplied to the manifold 82 flows upwardly through a plurality of first cooling holes, or first array of internal passageways, 214 that are circumferentially spaced and that are vertically disposed in the upper receiver cap 40. The cooling holes 214 in the upper receiver cap 40 register with a plurality of second cooling holes, or second array of internal passageways, 216 that are circumferentially spaced around a ring axis 217 of the neck ring 28 and that are vertically disposed therein.

When the neck ring holder 30 returns the neck ring 28 from the blow molding portion, not shown, to the parison molding portion of the glassware molding machine, the neck ring holder 30 places the neck ring 28 on the upper receiver cap 40 with the ring axis 217 thereof substantially concentric with the central axis 185; and the cooling holes 216 are concentric with respective ones of the cooling holes 214.

The second cooling holes 216 are larger in diameter than the first cooling holes 214 so that there is a jet effect of the air flowing from the first cooling holes 214 into the second cooling holes 216. This jet effect assists in preventing the cooling air from escaping between a top surface 218 of the upper receiver cap 40 and a bottom surface 220 of the neck ring 28.

The second cooling holes 216 are divided into cooling hole portions 222a and 222b by the internal groove 38 in the neck ring 28. Flow of cooling air upwardly from the cooling hole portions 222a, through the finish guide ring 36, and into the cooling hole portion 222b is by means of a plurality of cooling slots 224, that are vertically disposed, and that are circumferentially spaced around the finish guide ring 36, as shown in FIG. 9.

A portion of the cooling air that has progressed upward through the second cooling holes 216 of the neck ring 28 is discharged through a plurality of circumferentially spaced and radially disposed cooling notches 226 that cut into the surface 188 of the neck ring 28 and into an outer periphery 228 of the neck ring 28.

The remainder of the cooling air flowing upward through the second cooling holes 216 flows into a plurality of third cooling holes, or third array of internal passageways, 230 that are circumferentially disposed around the parison mold 22 and that are vertically disposed therein. This remainder of the cooling air exits through the top surface 196 of the parison mold 22 and is exhausted through a plurality of fourth cooling holes, or fourth array of internal passageways, 232 that are disposed in the baffle 26.

Thus the neck ring 28 is cooled by air flowing through the cooling hole portions 222a of the second cooling holes 216, through the cooling slots 224 of the finish guide ring 36, through the cooling hole portions 222b of the second cooling holes 216, and through the cooling notches 226. The flow of air through the cooling notches 226 provides cooling for the neck ring 28 by means of a plurality of cooling fins 234 that are formed by, and that are disposed circumferentially intermediate of, the cooling notches 226, as shown in FIG. 10.

It has been found advantageous to employ control valve means 236 in conjunction with the aforementioned mold baffle 26. In this regard a baffle control valve which is either automatic and responsive to temperature could be used or a manual valve which can be adjusted by an operator in conjunction with the passageways associated with the baffle may also be readily used in order to control the proper amount or degree of cooling.

In summary, the parison plunger 116 of the parison molding portion 20 is cooled by air that flows upwardly through a longitudinal exhaust hole 156 and that flows downwardly through a plurality of third exhaust holes 162.

The neck ring 28 is cooled by a plurality of second cooling holes 216 that are circumferentially spaced and that are vertically disposed; and the neck ring 28 is also cooled by a plurality of cooling notches 226 and by a plurality of cooling fins 234 that are disposed circumferentially intermediate of the cooling notches 226.

Because the plurality of second cooling holes 216 in the neck ring 28 may be positioned closer to the inside surface 108 of the neck ring 28 and still retain sufficient strength and rigidity, than could longitudinally disposed slots opening through an outside surface 238 of the neck ring 28, the cooling holes 216 are more effective in cooling the neck ring 28 than the slots of the prior art.

The parison mold 22 is cooled by a portion of the air from the second cooling holes 216 of the neck ring 28 being directed upwardly through a plurality of third cooling holes 230 that are circumferentially spaced and that are vertically disposed in the mold 22.

Thus it is apparent that, since the entire cooling air is used to cool the neck ring 28, but only a portion of the air is used to cool the mold 22, greater cooling is provided for neck ring 28.

Referring now to FIG. 3, communication of cooling air with the second plurality of cooling holes 216 is made by the upper receiver cap 40 being resiliently urged upward against the neck ring 28 by a resilient urging force that is created by air pressure in the receiver cap manifold 82; but the neck ring 28 is allowed to move downwardly and to rest down against the neck ring holder 30 by the resiliency, and limited force, of this resilient urging force.

Thus, when the parison mold halves 24a and 24b close, they can close without interference between the surface 189 of the parison mold 22 and the surface 190 of the neck ring 28; because the neck ring 28 is resting down against the neck ring holder.

Then, as the neck ring 28 is raised and clamped against the parison mold 22 by the first frustoconical surface 187, the resilient urging force of air pressure in the receiver cap manifold 82 is effective to raise the upper receiver cap 40 and to maintain contact between the upper receiver cap 40 and the neck ring 28, thereby continuing fluid communication between the first plurality of cooling holes 214 and the second plurality of cooling holes 216 as communication is established from the second plurality of cooling holes 216 in the neck ring 28 to the third plurality of cooling holes 230 in the parison mold 22 by the clamping action of the first frustoconical surface 187.

The results are that cooling of the neck ring 28 is continuous wherever the neck ring is on the parison molding portion 20 of the individual section glassware molding machine, which is about 80% of the total cycle time; and that cooling of the parison mold 22 is continuous whenever the parison mold halves 24a and 24b are closed.

Therefore, greater cooling is provided for the neck ring 28 than for the parison mold 22, not only by virtue of all of the cooling air being directed through the second plurality of cooling holes 216 as opposed to only a part of the cooling air being directed through the third plurality of cooling holes 230, but also by virtue of the cooling air being directed through the second plurality of cooling holes 216 for a greater percentage of the time than the cooling air is directed through the third plurality of cooling holes 230.

Thus the objective of the present invention, that is, greater cooling of the neck ring 28 than of the mold 22, has been achieved; and the resulting parison 198 will have a finish portion 202 that is cooler than the container portion 208.

The results are that the finish portion 202 of the parison 198 has sufficient mechanical strength and dimensional stability to withstand forces imparted upon the finish portion 202 in the blow molding operation; and the container portion 208 retains sufficient heat and plasticity to allow blow molding of the container, not shown, into the completed shape.

While specific apparatus has been disclosed in the preceding description, it should be understood that these specifics have been given for the purpose of disclosing the principles of the present invention and that many variations thereof will become apparent to those who are versed in the art. Therefore, the scope of the present invention is to be determined by the appended claims.

INDUSTRIAL APPLICABILITY

The present invention is applicable to individual glassware molding machines of the type having a parison molding portion in which a parison with both a finish portion and a container portion is formed, and having a blow mold portion to which the parison is transferred, held by the finish portion of the parison, and blown into a completed container.

We claim:

1. A molding surface assembly for formation of a glass parison comprising a receiver having a first array of internal passageways, molding body having a parison forming portion defining a mold cavity for said glass parison and a finish molding portion adapted to form the finish of the parison, said finish molding portion having a second array of internal passageways spaced substantially closer to the inner surface of said finish molding portion than to the outside surface of the finish molding portion, said first and second internal arrays of passageways being in substantial alignment with one another, and said first array having a cross sectional area smaller than the second array.

2. A mold structure device for forming a glass parison during a press and blow operation comprising a receiver having a fluid carrying passage and a first array of internal passageways communicating between said fluid carrying passage and the surface of said receiver, said receiver comprising a first portion and a second portion with said first portion being slidably received in said second portion, a neck ring having a second array of internal passageways positioned to be in substantial alignment with the first array when said receiver and neck ring are juxtaposed with one another, and, said fluid carrying passage and said receiver first portion in cooperation with said receiver second portion providing means for resiliently urging said first portion of the receiver against said neck ring and maintaining communication between said first array and said second array of passageways.

3. A parison molding portion of an individual section glassware molding machine for pressing a gob of molten glass into a blank mold by means of a plunger inserted into an associated parison and neck mold to form a parison having a body portion and an integral finished neck portion, which parison molding portion comprises:

a parison mold being disposed around a central axis that is substantially vertical, having first and second mold portions that are transversely separable from said central axis and that are transversely closeable to form said parison mold, and having a lower surface that is disposed substantially orthogonal to said central axis;

a receiver being disposed circumferentially around said central axis, having a fluid carrying passage therein that is disposed circumferentially around said central axis, having a top surface that is disposed substantially orthogonal to said central axis, and having a first array of internal passageways that are spaced circumferentially around said central axis and that communicate said fluid carrying passage to said top surface;

a neck ring having a ring axis, having a first surface that is disposed substantially orthogonal to said ring axis, having a second surface that is disposed substantially parallel to said first surface and that is spaced apart therefrom, and having a second array of internal passageways that are disposed substantially parallel to said ring axis, that are spaced circumferentially around said ring axis, and that intercept both said first surface and said second surface;

neck ring holder means for receiving and retaining said neck ring, for transferring said neck ring and a parison from said parison molding portion of said individual section glassware molding machine to a blow mold portion thereof, for returning said neck ring to said parison molding portion with said neck ring disposed intermediate of said receiver and said parison mold, with said ring axis and said central axis substantially coinciding, and with said first surface of said neck ring disposed downwardly, for supporting said neck ring, and for allowing limited movement of said neck ring along said ring axis; and means for resiliently urging said top surface of said receiver upwardly and into contact with said neck ring when said neck ring holder means returns said neck ring to said parison molding portion.

4. A parison molding portion as claimed in claim 3 in which said receiver comprises an upper receiver cap, a lower receiver cap, means for telescopically connecting said upper receiver cap and said lower receiver cap, and means for substantially sealing said telescopic connection;

said parison molding portion includes an air powered actuator, comprising said fluid carrying passage of said receiver, and comprising said telescopic connection of said upper receiver cap and said lower receiver cap; and said means for resiliently urging said top surface of said receiver upwardly and into contact with said first surface of said neck ring comprises said air powered actuator.

5. A parison molding portion as claimed in claim 3 in which said means for resiliently urging said top surface upwardly and into contact with said neck ring comprises means for allowing said neck ring to be forced downwardly toward said neck ring holder means.

6. A parison molding portion as claimed in claim 5 in which said mold portions include clamping means, comprising a circumferential groove, for clamping said second surface of said neck ring to said lower surface of said parison mold when said mold portions close.

7. A parison molding portion as claimed in claim 6 in which said parison mold includes a third array of internal passageways that are disposed substantially parallel to said central axis, that are circumferentially spaced around said central axis, that open through said lower surface, and that communicate with said second array of internal passageways when said neck ring is clamped against said parison mold.

8. A parison molding portion as claimed in claim 7 in which said receiver comprises an upper receiver cap, a lower receiver cap, means for telescopically connecting said upper receiver cap and said lower receiver cap, and means for substantially sealing said telescopic connection;

said parison molding portion includes an air powered actuator, comprising said fluid carrying passage of said receiver, and comprising said telescopic connection of said upper receiver cap and said lower receiver cap; and said means for resiliently urging said top surface of said receiver upwardly and into contact with said first surface of said neck ring, and for resiliently allowing said neck ring to force said receiver downwardly comprises said air powered actuator.

9. A parison molding portion as claimed in claim 7 in which said neck ring includes bypassing means for bypassing a portion of said fluid external of said parison molding portion prior to entry of said fluid into said third array of internal passageways.

10. A parison molding portion as claimed in claim 7 in which said parison mold includes an upper surface;

said third array of internal passageways extend upwardly through said upper surface;

said parison molding portion includes baffle means for closing said parison mold by contact with said upper surface of said parison mold;

said baffle means includes a fourth array of passageways that communicate with said third array of internal passageways and that extend outwardly through said baffle means; and said baffle means includes valve means for controlling fluid exiting from said fourth array of passageways.

11. A parison molding portion as claimed in claim 7 in which said means for allowing said neck ring to be forced downwardly toward said neck ring holder means comprises means for allowing said neck ring holder means to be forced downwardly by the weight of said neck ring and to be supported by said neck ring holder means.

12. A parison molding portion as claimed in claim 11 in which said clamping means comprises means for lifting said neck ring from said support of said neck ring holder means.

13. A parison molding portion as claimed in claim 3 in which said neck ring includes an internal groove that divides said second array of internal passageways into two separate cooling hole portions;

said parison molding portion includes a finish guide ring that is disposed in said internal groove; and said finish guide ring includes intermediate passageway means, for intercommunicating respective ones of said separate cooling hole portions.

14. A parison molding portion as claimed in claim 13 in which said intermediate passageway means comprises a plurality of arcuately shaped slots that are disposed substantially parallel to said central axis.

15. A parison molding assembly for pressing a gob of molten glass into a blank mold by means of a plunger inserted into associated parison and neck mold portions along a central axis to form a parison having a body portion and an integral finished neck portion, which parison molding assembly comprises:

a receiver disposed around the central axis and comprising an upper receiver cap having a top surface and a lower receiver cap slidably engagable with said upper receiver cap along cooperating portions, said upper receiver cap having a fluid carrying passage spaced internally and disposed circumferentially around said central axis, said fluid carrying passage being juxtaposed to said cooperating portions, said upper receiver cap having a first array of internal passageways that are spaced circumferentially around said central axis and that communicate said fluid carrying passage to said top surface, a neck ring having a ring axis, a lower surface that is engagable with the top surface of the receiver cap, an upper surface that is spaced apart therefrom, and a second array of internal passageways that are disposed substantially parallel to said central axis, said second array of internal passageways being spaced circumferentially around said central axis, and intercepting both said upper surface and said lower surface of said receiver cap, and a parison mold having first and second mold portions that are transversely separable from said central axis and that are transversely closable to form said parison mold, said parison mold having a third array of internal passageways that are disposed substantially parallel to said central axis, that are circumferentially spaced around said central axis, that open through a lower surface of said parison mold that is engagable with the upper surface of said neck ring, and that communicate with said second array of internal passageways when said neck ring is in abutment with said parison mold whereby said first, second and third arrays of internal passageways are in substantial alignment to provide straight line flow of fluid therethrough.

16. A parison molding assembly to form an integral finish neck portion of a parison, which parison molding assembly comprises: a receiver spaced from and disposed adjacent to a finish mold, said receiver having an internal manifold circumferentially spaced within said receiver for carrying a fluid, said receiver having a first array of internal passageways extending from said manifold within said receiver, said finish mold having a second array of internal passageways in registry with said first array, said second array being spaced from the inner and outer walls of said finish mold to provide straight line flow extending internally along the full length of and parallel to the inner wall of said finish mold.

17. A parison molding assembly as in claim 16 wherein the receiver comprises an upper receiver cap and a lower receiver cap slidably engagable with the upper receiver cap along cooperating surfaces therebetween for resiliently urging said upper receiver cap into contact with said neck ring.

18. A parison molding assembly as set forth in claim 16 wherein the passageways of said second array of passageways are spaced substantially closer to the inner wall than to the outer wall of the neck ring and have a cross section larger than the passageways of the first array of passageways.

19. The process of cooling mold portions during the forming of molten glass in a parison molding assembly of an individual section glassware forming machine to form a parison by means of a plunger inserted into a neck ring with an associated finish guide ring, receiver and blank molding means arranged and adapted to define a finish neck portion and an integral body blank portion, said process comprising providing the receiver spaced from and disposed adjacent to said neck ring with an internal manifold circumferentially spaced within said receiver for carrying a fluid, providing a first array of internal passageways extending from said manifold within said receiver to a second array of internal passageways in said neck ring and in registry with said first array, said second array being spaced from the inner and outer walls of said neck ring and associated finish guide ring and providing straight line flow extending vertically and internally along the full length of and parallel to the inner wall of said neck ring including the associated finish guide ring, and passing the fluid through said manifold to said first and second arrays to effect cooling of said neck ring including the associated finish guide ring of said parison molding assembly.

20. A process as recited in claim 19 wherein a third array of internal passageways are arranged within said body blank portion for placement against said second array to provide further straight line low therethrough.

21. A process of cooling mold portions during the forming of molten glass in a parison molding assembly of an individual section glassware forming machine to form a parison by means of a plunger inserted into a neck ring with an associated finish guide ring, receiver and blank molding means arranged and adapted to define a finish neck portion and an integral body blank portion, said process comprising providing molding means having blank molding surfaces that are transversely separable and transversely closable to form said blank portion, providing the receiver spaced from and disposed adjacent to said neck ring with an internal manifold circumferentially spaced within said receiver for carrying a fluid, providing a first array of internal passageways extending from said manifold within said receiver to a second array of internal passageways in said neck ring and in registry with said first array, said second array being spaced from the inner and outer walls of said neck ring and associated finish guide ring, and providing straight line flow extending vertically and internally along the full length of and parallel to the inner wall of said neck ring including the associated finish guide ring, resiliently urging said receiver into contact with said neck ring and passing the fluid through said manifold to said first and second arrays to effect cooling of said neck ring including the associated finish guide ring of said parison molding assembly.

22. A process as recited in claim 21 wherein a third array of internal passageways are arranged within said body blank portion for placement against said second array to provide further straight line flow therethrough.

* * * * *